United States Patent
Willi et al.

(10) Patent No.: US 8,037,995 B2
(45) Date of Patent: Oct. 18, 2011

(54) CONVEYOR COMPRISING A CURVE

(75) Inventors: Marco Willi, Benningen am Neckar (DE); Boris Buesing, Stuttgart (DE); Hans-Peter Buttau, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/620,879

(22) Filed: Nov. 18, 2009

(65) Prior Publication Data
US 2010/0126828 A1 May 27, 2010

(30) Foreign Application Priority Data
Nov. 21, 2008 (DE) .................... 10 2008 058 403

(51) Int. Cl.
*B65G 47/53* (2006.01)
*B65G 21/20* (2006.01)
*B65G 17/32* (2006.01)

(52) U.S. Cl. ........... 198/457.01; 198/457.05; 198/465.1; 198/465.2

(58) Field of Classification Search ................ None
See application file for complete search history.

(56) References Cited

U.S. PATENT DOCUMENTS

| | | | |
|---|---|---|---|
| 2,478,919 A | 8/1949 | Hansell | |
| 2,700,451 A | 1/1955 | Burkhart | |
| 3,667,589 A | 6/1972 | Constable | |
| 3,672,486 A | 6/1972 | Kennedy et al. | |
| 4,205,746 A | 6/1980 | Olson et al. | |
| 4,733,772 A | 3/1988 | Potter | |
| 4,899,865 A | 2/1990 | Keil | |
| 4,928,806 A | 5/1990 | Anderson et al. | |
| 4,951,808 A | 8/1990 | Collins et al. | |
| 5,038,922 A | 8/1991 | Collins et al. | |
| 5,188,215 A | 2/1993 | Riezler | |
| 5,190,142 A * | 3/1993 | Stadler .................. | 198/774.3 |
| 5,287,956 A | 2/1994 | Collins et al. | |
| 5,375,696 A | 12/1994 | Collins et al. | |
| 5,485,911 A | 1/1996 | Kettelson et al. | |
| 5,524,748 A * | 6/1996 | McTaggart ............. | 198/774.3 |
| 6,367,618 B1 | 4/2002 | Szuba | |
| 7,878,320 B2 | 2/2011 | Freudelsperger | |
| 2002/0066647 A1 | 6/2002 | McTaggart et al. | |
| 2003/0168319 A1 | 9/2003 | Hart et al. | |
| 2008/0190741 A1 | 8/2008 | Freudelsperger | |

FOREIGN PATENT DOCUMENTS

| | | |
|---|---|---|
| CA | 2 165 031 | 6/1996 |
| DE | 386 868 | 12/1923 |
| DE | 709 274 | 8/1941 |
| DE | 720 459 | 5/1942 |
| DE | 1 071 587 | 12/1959 |
| DE | 1 147 893 | 4/1963 |
| DE | 1 939 568 | 2/1970 |
| DE | 88 13 730 | 3/1989 |

(Continued)

*Primary Examiner* — Kavel Singh
(74) *Attorney, Agent, or Firm* — Michael J. Striker

(57) ABSTRACT

A conveyor includes at least one workpiece carrier, a drive provided for the workpiece carrier and defining a plane of conveyance; an inner guide and an outer guide having a curved outer guide section and defining a conveyor track for the workpiece carrier; the inner guide includes a curved inner guide section that is assigned to the curved outer guide section. The convexly curved inner guide section is situated such that it is offset radially inwardly relative to the curved outer guide section and opposite an imagined tangential extension of a first and a second straight inner guide section.

15 Claims, 7 Drawing Sheets

FOREIGN PATENT DOCUMENTS

| | | |
|---|---|---|
| DE | 40 36 214 | 11/1991 |
| DE | 9012413 | 1/1992 |
| DE | 692 01 119 | 5/1995 |
| DE | 195 00 546 | 7/1996 |
| DE | 195 24 308 | 1/1997 |
| DE | 100 02 719 | 4/2001 |
| DE | 695 21 677 | 10/2001 |
| DE | 20 2005 009 213 | 9/2005 |
| DE | 10 2005 019 067 | 3/2007 |
| DE | 10 2007 018 889 | 10/2008 |
| EP | 0 129 911 | 1/1985 |
| EP | 0 610 085 | 8/1994 |
| EP | 0 690 015 | 1/1996 |
| EP | 1 157 780 | 11/2001 |

* cited by examiner

CONVEYOR COMPRISING A CURVE

CROSS-REFERENCE TO A RELATED APPLICATION

The invention described and claimed hereinbelow is also described in German Patent Application DE 10 2008 058 403.7 filed on Nov. 21, 2008. This German Patent Application, whose subject matter is incorporated here by reference, provides the basis for a claim of priority of invention under 35 U.S.C. 119(a)-(d).

This application contains a subject matter which can be similar to the subject matter disclosed in U.S. patent application Ser. No. 12/432,120 filed Apr. 29, 2009, and U.S. patent application Ser. No. 12/422,495 filed on Apr. 13, 2009.

BACKGROUND OF THE INVENTION

The present invention relates to conveyor, and to a workpiece carrier for a conveyor.

A conveyor is made known in DE 40 36 214 C2. According to FIG. 1 in DE 40 36 214 C2, the conveyor includes a workpiece carrier 4 which is driven in a frictional manner via drive means designed as conveyor rollers 3 or conveyor belts, in which case the drive means define a plane of conveyance. Furthermore, an inner guide and an outer guide are provided, which guide the workpiece carrier in a laterally sliding manner and thereby define a conveyor track for it, and in which case the conveyor track describes a curve. The outer guide is formed by a first and a second straight outer guide section 5 which are oriented perpendicularly to one another, and which are interconnected via a concavely curved outer guide section 7 such that the workpiece carrier is guided without interruption. The curved outer guide section is formed by a separate guide piece 7 which is fastened to the straight outer guide sections.

The inner guide is situated equidistantly to the outer guide at a specified track width, thereby resulting in a first and a second straight inner guide section 5 which are interconnected via a curved inner guide section 6a. The circularly curved inner guide section is situated tangentially to the straight inner guide sections, thereby ensuring smooth guidance of the workpiece carrier on the inner guide as well. The track width is selected to be minimally greater than the width of the workpiece carrier, and so the workpiece carrier is designed to slide without play or friction.

The drive means and its driving force extend only parallel to the straight sections of the conveyance path, and so they do not extend parallel to the direction of conveyance in the region of the curve. This results in the problem that the driving force in the curve acts on the workpiece carrier at an unfavorable angle, while the tractive resistance in the curve is simultaneously increased relative to the straight-ahead travel of the workpiece carrier. To convey the plate-type workpiece carrier around the curve in the most reliable manner possible, its lateral side is designed to have a rounded oblong shape. However, due to the frictional driving action between the drive means and the conveyor, it is possible for the workpiece carrier to become stuck in the curve. The possibility that workpiece carriers may become stuck in the curve poses a serious problem, because conveyors of this type are typically part of a larger flow-line production system. If the conveyance flow becomes interrupted, the entire production line therefore quickly comes to a standstill, thereby possibly resulting in considerable production losses. It is therefore expected that the curve of a conveyor function in a highly reliable manner, and that it be nearly impossible for the workpiece carrier to become stuck.

The curve described in DE 40 36 214 C2 is characterized by the fact that the radius of curvature of the curved inner guide section is very small. As a result, the workpiece carrier performs an approximately purely rotational motion in the curve when it is engaged with the curved inner guide section in a guiding manner. Since the curved inner guide section is very short in the circumferential direction, the sliding motion is very slow when traveling around the curve, and the friction is therefore minimal. It is simultaneously ensured that the workpiece carrier remains favorably oriented relative to the drive means at all times when traveling around the curve. This curve shape is different, e.g., from the curve shape made known in FIG. 9 in U.S. Pat. No. 4,928,806, in which the curved inner guide has a much greater turning radius. In curves of this type, a separate drive is usually required in the curve region, since the workpiece carrier undergoes considerable displacement, in addition to pure rotation.

A consequence of the small turning radius of the curved inner guide described in DE 40 36 214 C2 is the likewise relatively small turning radius of the curved outer guide, which results in a high frictional force between the outer guide and the workpiece carrier. In addition, the rounded oblong shape of the workpiece carrier usually results in there being a great deal of unused space which may not be utilized by the workpieces, which is why a rectangular workpiece carrier is usually preferred.

SUMMARY OF THE INVENTION

The object of the present invention is to increase the operational reliability of the conveyor, and, in particular, to reduce the tractive resistance of the workpiece carrier in the curve. At the same time, it should be possible to use a workpiece carrier on the conveyor that is as large as possible and is substantially rectangular.

According to the invention, it is provided that the convexly curved inner guide section is situated such that it is offset radially inwardly relative to the curved outer guide section and opposite an imagined tangential extension of a first and a second straight inner guide section. Via this measure, substantially more space is made available for the workpiece carrier in the curve region. As a result, the curve may even be navigated by a workpiece carrier that is rectangular or square without the fear that the workpiece carrier will collide with the straight outer guide section, which would bring the further conveyance of the workpiece carrier to a complete halt. The known rounded oblong shape of the workpiece carrier is no longer necessary. In addition, the radius of the curved outer guide section may be increased considerably via the additional play for the workpiece carrier, thereby reducing the tractive resistance of the workpiece carrier.

Given all of the above, the small turning radius between the curved inner guide section and the workpiece carrier may be retained, thereby eliminating the fear that the tractive resistance will increase at this point. This small inner turning radius is considered essential to the present invention because the usability of the present curve depends to a decisive extent on the fact that the workpiece carrier performs a nearly purely rotational motion while it is engaged with the curved inner guide in a guiding manner.

The first and/or second straight inner guide section may have an end, and the inner guide is designed in the region between the stated end and the convexly curved inner guide section such that contact between the inner guide and the workpiece carrier is ruled out. As explained in greater detail below, the workpiece carrier must not touch the inner guide when passing through the curve according to the present invention in the transition region between the end of the straight inner guide and the convexly curved inner guide section, while nevertheless ensuring that the workpiece carrier will be guided adequately. Accordingly, it is provided that the inner guide is designed such that contact absolutely may not take place in this region, thereby preventing unnecessary frictional forces from occurring, which would increase the tractive resistance of the workpiece carrier.

It is feasible to design the inner guide in this region as an uninterrupted curve. In this case, the end of the straight inner guide is the point at which the aforementioned curve deviates from the straight course for the first time. In the transition region, the extension of the uninterrupted inner guide is offset from the conveyor track so far that the aforementioned contact between the inner guide and the workpiece carrier is ruled out. For this purpose, the inner guide may be concavely curved in the transition region, as viewed from the conveyor track. However, due to the fact that manufacture is simplified, it is preferable to design the two straight inner guides and the convexly curved inner guide section as separate components, in which case there is space between the aforementioned components in the transition region. The inner guide is therefore interrupted in the transition region. In this embodiment, the end of the straight inner guide is defined by the end of the assigned component.

An evading recess may be provided in a first lateral surface of the workpiece carrier facing the inner guide, and is designed such that the movement of the workpiece carrier may not become blocked by the end of the first straight inner guide section. It is assumed that the workpiece carrier is moved by the drive means in a conveyance direction through the curve, the conveyance direction extending from the first outer or inner guide section toward the second outer or inner guide section. Typically, the aim is to design the first inner guide to be as long as possible, i.e., to allow its end to extend into the curve as far as possible, so that the preferably substantially rectangular workpiece carrier is designed to have the longest sides possible. However, as soon as the end of the workpiece carrier located at the front in the direction of conveyance engages with the curved guide section in a guiding manner, the workpiece carrier is deflected radially inwardly, and so its inner lateral surface would be pressed against the first end of the inner guide. It would therefore be impossible for the workpiece carrier to continue.

The evading recess is provided to counteract this; it provides open space into which the end of the first inner guide may extend, preferably without touching the workpiece carrier. The depth and longitudinal extension of the evading recess must be matched to the existing curve geometry. It has been shown, surprisingly, that the depth of the evading recess need not be very deep for the aforementioned collision to be prevented. The shape of the workpiece carrier therefore deviates only slightly from the preferred rectangular shape, and so there are no disadvantages associated with its use. The evading recess is preferably located, relative to the direction of travel, behind a deflection surface section on the inner lateral surface of the workpiece carrier, in which case the deflection surface section is the section of the inner lateral surface that is engaged with the curved inner guide section in a guiding manner when the workpiece carrier is engaged in a guiding manner with the curved outer guide section.

The end of the second straight inner guide section may be situated such that a guide surface section of the inner lateral surface of the workpiece carrier may engage in a guiding manner with the aforementioned end of the second straight inner guide section. In this case as well, it is assumed that the workpiece carrier is moved through the curve by the drive means in a conveyance direction that extends from the first outer or inner guide section toward the second outer or inner guide section. During the passage through the curve, the guiding engagement between the deflection surface section and the curved inner guidance section ends when the leading end of the workpiece carrier engages with the second straight outer guide section. The aforementioned guidance engagement between the guide surface section and the end of the second straight inner guide section is provided in order to ensure sufficient inner guidance in this phase of movement as well.

The guide surface section is preferably located in front of the deflection surface section, relative to the direction of conveyance. Since the end of the second straight inner guide section moves substantially in a point-by-point manner along the guide surface section, it is ensured that minimal friction results. This friction does not create the risk that the workpiece carrier will become stuck, because the workpiece carrier is oriented approximately parallel to the driving direction of the driving means in this phase of movement, and so the drive forces function in an optimal manner. In this case, the driving direction extends parallel to the second straight inner or outer guide section.

The inner lateral surface of the workpiece carrier may have an uninterrupted, smooth shape. As a result, a particularly even and interference-free engagement between the workpiece carrier and the inner guide is made possible, thereby making it even more difficult for the workpiece carrier to become stuck.

The inner lateral surface of the workpiece carrier may have a wave-shaped design, including a wave crest, a first wave trough which is used as the evading recess, and a second wave trough which corresponds to the guide surface section; the wave crest is situated such that it may engage in a guiding manner with the curved inner guide section. The wave-shaped inner guide surface is preferably designed to have mirror symmetry relative to a plane that is transverse to the conveyor track. The wave crest therefore corresponds to the aforementioned deflection surface section. Due to the wavy shape of the inner guide surface, the various functional sections transition into one another in a particularly gentle manner, thereby making it even more difficult for the workpiece carrier to become stuck. Due to the preferable symmetrical design of the inner guide contour, and particularly preferably, of the entire workpiece carrier, the workpiece carrier may be moved in both possible conveyance directions of the conveyor track. If the direction of conveyance is reversed, the functions of the ends of the first and second straight inner guide sections are reversed.

The distance between the ends of the first and the second straight inner guide sections and the curved inner guide section may be substantially the same. This measure also ensures that the direction of conveyance may be reversed. Accordingly, this design is particularly advantageous when used in conjunction with the aforementioned, symmetrical workpiece carrier.

A rotatable guide roller may be provided at the end of the first and/or second straight inner guide section(s), which may enter into guiding engagement with the workpiece carrier such that it rolls on the guide surface section. The purpose of the guide roller is to reduce the frictional forces between the guide surface section and the end of the second straight inner guide section. The guide roller at the end of the first straight inner guide section is provided for the case in which the conveyor is operated in both possible directions of conveyance of the conveyor track.

The workpiece carrier may include four corner sections which define the corners of an imagined rectangle; the workpiece carrier does not extend beyond the imagined rectangle at the height of the inner and outer guides. The workpiece carrier is preferably designed symmetrical to the longitudinal and transverse axes of the imagined rectangle. As mentioned several times above, it is preferably intended for a rectangular workpiece carrier to be used. To reduce its surface friction drag relative to the inner and outer guides, it is designed such that it touches the aforementioned guides only at the four corner sections, in order to reduce the contact surface and, therefore, friction. This applies, in particular, in the straight sections of the conveyor track and in the curved outer guide section. The contact, according to the present invention, of the workpiece carrier with the inner guide in the region of the curve takes place with this embodiment as well, of course.

The four corner sections may be designed as rotatable guide rollers. As a result, the aforementioned corner sections roll smoothly on the assigned inner and outer guides, thereby resulting in particularly low friction. A workpiece carrier of this type that is provided with the aforementioned wave-shaped inner guide surface is particularly well suited for ensuring smooth operation in the curve according to the present invention. Independent protection is therefore sought for this workpiece carrier.

The workpiece carrier may include a body; the guide rollers are accommodated in a recess in the body. As a result of this design, the useful surface of the workpiece carrier on the top side of the preferably plate-type body may extend to close to the contour of the guide roller. The aforementioned useful surface is therefore particularly large, and the preferred rectangular shape is not interfered with. At the same time, the guide rollers are accommodated in the recess in a protected manner, and so they are protected from damage even when the workpiece carrier is stored away from the conveyance path, or is handled in any other manner.

The curved outer guide section and the curved inner guide section may be circularly curved about the same center of a circle. The deflection surface section is preferably likewise circularly curved. Whether or not the workpiece carrier becomes stuck depends on the smallest radius of curvature of the curved outer guide section. It is therefore most favorable to select a constant radius of curvature, i.e., a circular shape, if the aim is to create a particularly space-saving curve. The preferable circular curvature of the deflection surface section results in a particularly uniform rotational motion of the workpiece carrier in the curve. In this case, the wave crest of the wave-shaped inner guide surface in particular should be circularly curved.

The curved inner guide section may be formed on a separate, plate-shaped inner guide part; a retaining assembly is provided, to which the inner guide part may be fastened in different radial positions relative to the curved outer guide section. Given that the position of the inner guide part is adjustable, the same retaining part may be used in various conveyors in which workpiece carriers having different dimensions are used. In this embodiment, the retaining assembly is preferably attached to the first and the second straight inner guide section, since this results in a particularly compact retaining assembly.

A pivotable rail arm may be provided, the pivot axis of which is perpendicular to the plane of conveyance and is located outside of the conveyor track; the rail arm forms the curved outer guide section and may be rotated into a position in which its end facing away from the pivot axis engages in a retaining recess of the retainer assembly, in which the inner guide part is located. A pivotable rail arm, which defines the curved outer guide section of a curve of a conveyance path, is basically known from the related art. In the case of rail arms of this type, the aim is typically to support the aforementioned end facing away from the pivot axis well in the end positions, so that the rail arm provides stiff guidance of the workpiece carrier. This support may be realized in a particularly cost-favorable manner using the proposed embodiment.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
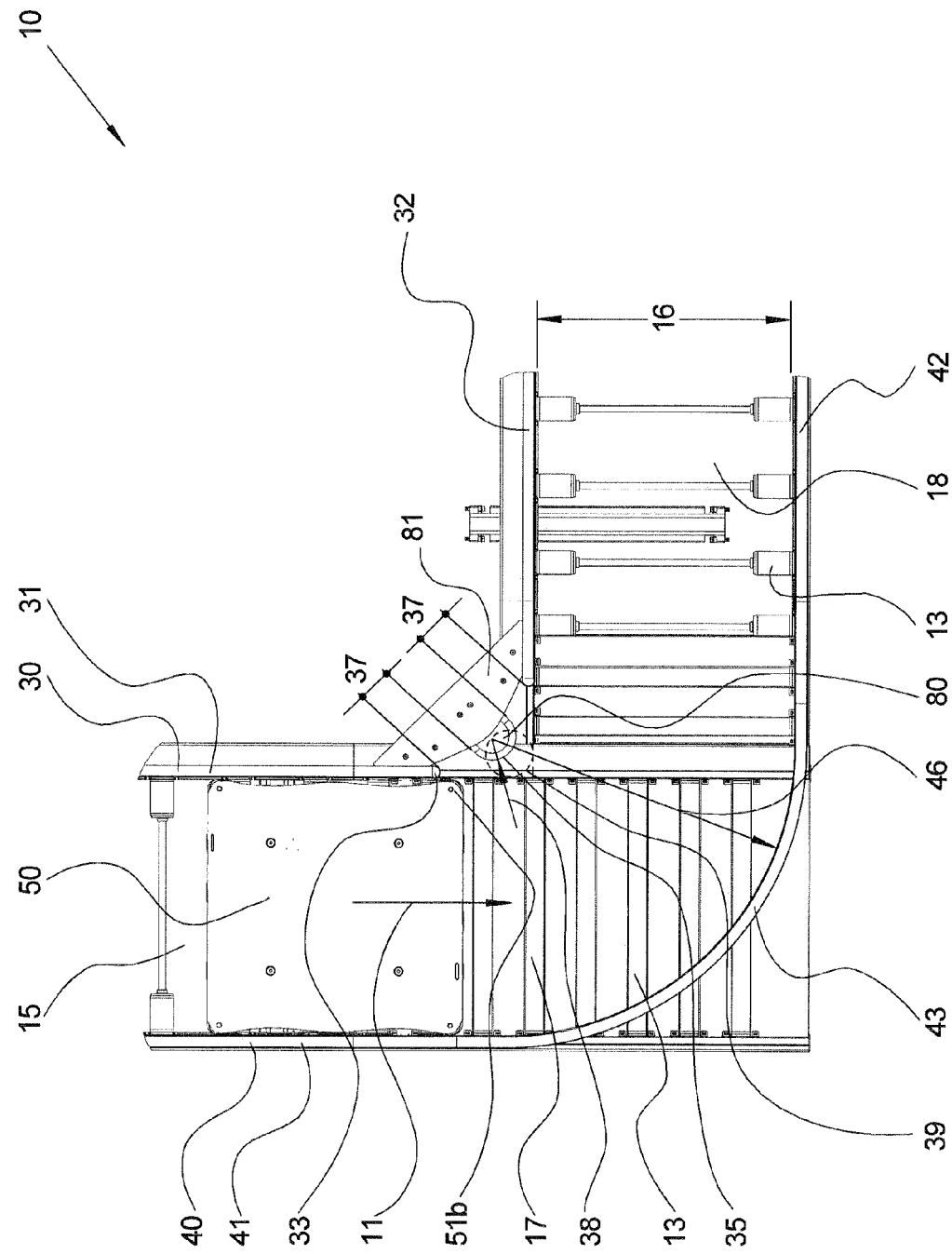
FIG. 1 shows a top view of a conveyor according to the present invention, in which the workpiece carrier is located in a first stage of traveling around a curve.

FIG. 1 shows a conveyor 10, according to the present invention, comprising a workpiece carrier 50; the curve that is shown is a section of a substantially more extensive conveyor system. Conveyor 10 includes a first roller track and a second roller track 17; 18, respectively, which are designed substantially separate from one another, and which are installed at right angles to one another. Roller tracks 17; 18 each include a large number of parallel conveyor rollers 13 which, when combined, define a plane of conveyance. Conveyor rollers 13 are driven individually, and the drive is designed as described in DE 10 2008 046 520 which is hereby referenced in entirety and is incorporated as subject matter of the present application. Conveyor rollers 13 are therefore used as frictional drive means for workpiece carrier 50, in order to set it in motion in a conveyance direction 11. Conveyor belts, roller chains, or the like may also be used as the drive means.

Workpiece carrier 50 is guided laterally by an inner guide 30 and an outer guide 40, which, when combined, define a curved conveyor track 15. Conveyor track 15 includes a straight section on each of the two roller tracks 17; 18; the straight section is defined by first and second outer guide sections 41; 42, and by assigned first and second inner guide sections 31; 32. The aforementioned straight inner and outer guide sections are situated parallel to one another and are separated from one another by a track width 16 which is slightly greater than the side length of substantially square workpiece carrier 50, thereby ensuring that workpiece carrier 50 is guided laterally with minimal play.

First and second straight outer guide sections 41; 42 are interconnected via a circularly curved outer guide section 43 which has an outer radius of curvature 46 that is approximately 1 to 2 times track width 16. Entire outer guide 40 is composed, without interruption, of a plurality of aluminum extruded profile sections, and so workpiece carrier 50 is guided on the outside without interruption.

A separate inner guide part 80 comprising a curved inner guide section 35, as inner guide 30, is assigned to curved outer guide section 43. Circularly curved inner guide section 35 has an inner radius of curvature 38 that is approximately 0.1 times track width 16; the centers of curvature of curved inner and curved outer guide sections 35; 43 coincide. The difference between outer radius of curvature 46 and inner radius of curvature 38 is greater than track width 16, and so curved inner guide section 35 is situated such that it is offset radially inwardly relative to curved outer guide section 43 and opposite an imagined tangential extension 39 of first and second straight inner guide sections 31; 32. In this context it should be noted that curved outer guide section 43 in the embodiment shown in FIG. 1 extends tangentially to first and second straight outer guide sections 41; 42. This must not necessarily be the case, however, as shown in the embodiment in FIG. 2.

Separate inner guide part 80 is fastened via a retaining assembly 81, which will be described in greater detail with reference to FIG. 4, to first and second inner guide sections 31; 32. An open space is located between rounded ends 33; 34 of the first and the second straight inner guide sections, and has a width 37 that is identical in both cases. Inner guide 30 is therefore interrupted in this transition region, and so workpiece carrier 50 is not guided laterally here.

FIG. 1 shows workpiece carrier 50 in a first stage of traveling around a curve; conveyance direction 11 extends from first roller track 17 to second roller track 18. FIGS. 1a through 1d show further stages of travel around a curve; otherwise these figures do not differ from FIG. 1. In FIG. 1, workpiece carrier 50 is located entirely within first straight outer and inner guide sections 41; 31, and front inner corner section 51b is located slightly behind end 33 of first straight inner guide section 31.

Figure 1A:
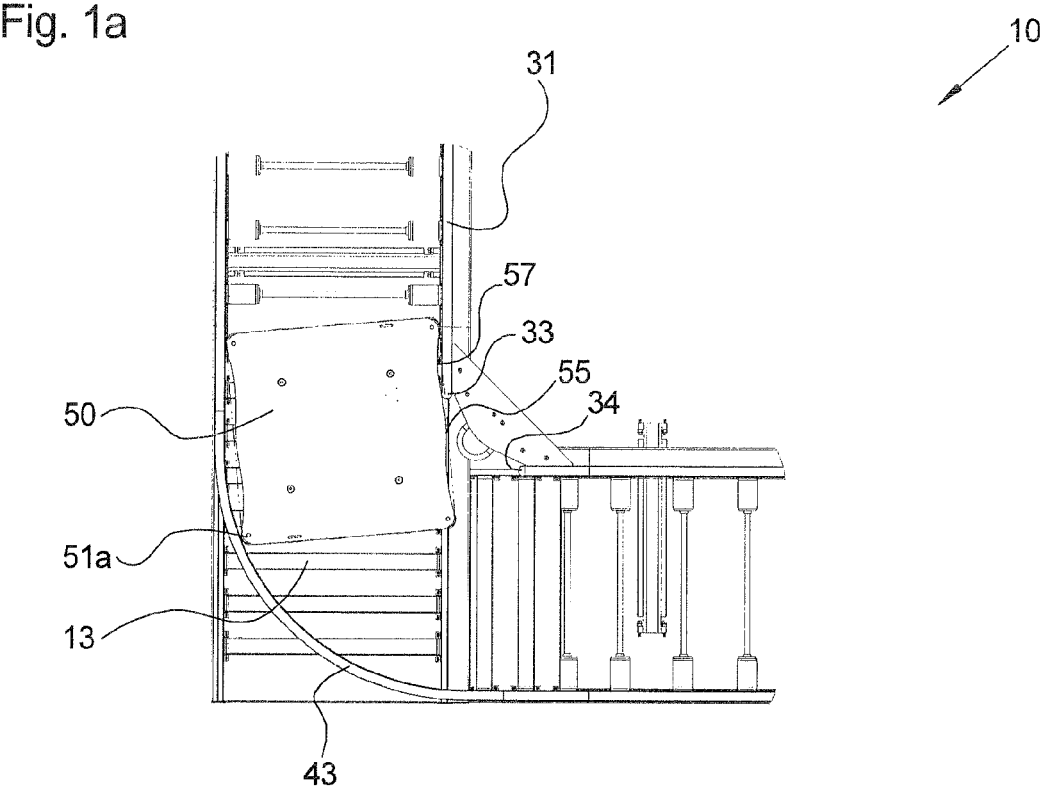
FIG. 1a shows a variation of FIG. 1, in which the workpiece carrier is located in a second stage of traveling around a curve.

FIG. 1a shows workpiece carrier 50 in a state in which leading outer corner section 51a has engaged in a guiding manner with curved outer guide section 43. As a result, workpiece carrier 50 is swiveled slightly toward the interior of the curve. To prevent a collision with end 33 of first straight inner guide section 31, an evading recess 57 is provided in corresponding inner lateral surface 55 of the workpiece carrier. Evading recess 57 is formed by a first wave trough of an entirely wave-shaped inner lateral surface 55. Evading recess 57 is designed so deep that blockage of the workpiece carrier is ruled out; the depth of evading recess 57 is selected such that, in many cases, no contact at all takes place between evading recess 57 and end 33 of first straight inner guide section 31. However, it should be noted that, in this phase of motion, the workpiece carrier is not guided in a statically determined manner, i.e., it is entirely possible to rotate workpiece carrier 50 so far toward the interior of the curve that evading recess 57 touches end 33 of first straight inner guide section 31. However, the frictional forces of conveyor rollers 13 that actually act on workpiece carrier 50 typically ensure that contact of this type does not take place.

Figure 1B:
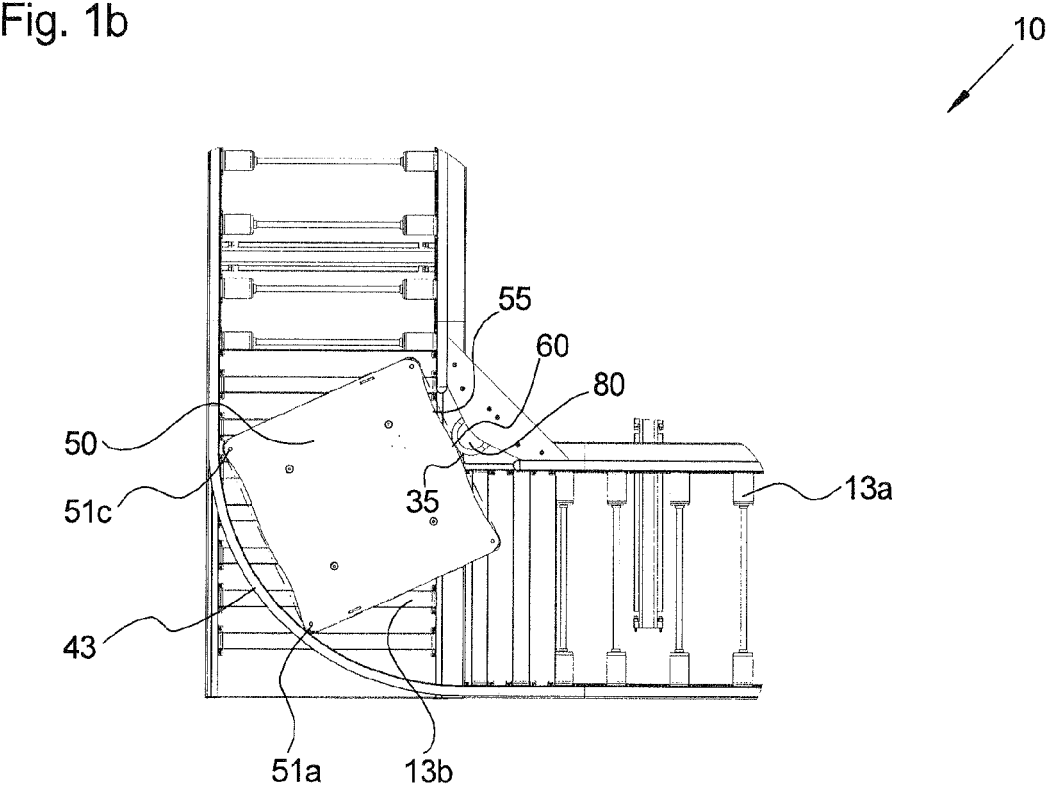
FIG. 1b shows a variation of FIG. 1, in which the workpiece carrier is located in a third stage of traveling around a curve.

FIG. 1b shows workpiece carrier 50 in a state in which wave crest 60 of inner lateral surface 55 has engaged in a guiding manner with curved inner guide section 35. In this phase of motion, front outer corner region 51a and rear outer corner region 51c of workpiece carrier 50 are located within curved outer guide section 43; a minimal amount of play, as shown in corner region 51c in FIG. 1b, must be ensured at all times, to prevent workpiece carrier 50 from becoming jammed. This play must be adjusted when the curve is installed such that workpiece carrier 50 may travel in an optimal manner. In the case of present conveyor 10, the play may be easily adjusted by moving inner guide part 80. Finally, in this procedure, the curved inner guide section is displaced radially, according to the present invention, in order to create enough space for workpiece carrier 50 to pass. It should also be pointed out that conveyor rollers 13b are designed as continuous rollers in this region of the curve, while interrupted conveyor rollers 13a outside of the curve carry workpiece carrier 50 only via their edges. This is necessary in order to ensure that there is an adequate frictional connection between workpiece carrier 50 and conveyor rollers 13b.

Figure 1C:
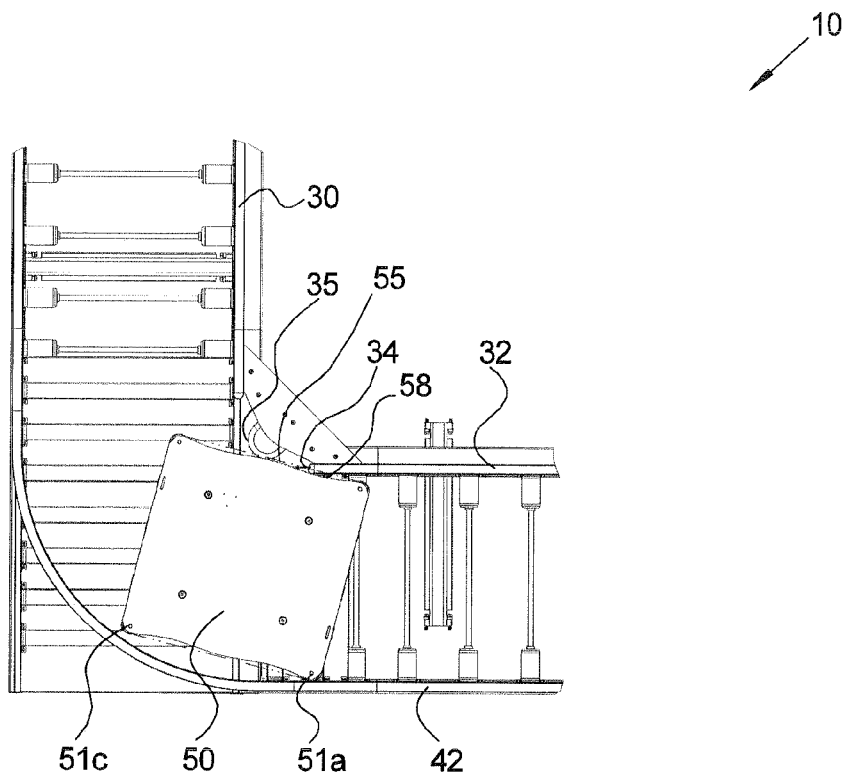
FIG. 1c shows a variation of FIG. 1, in which the workpiece carrier is located in a fourth stage of traveling around a curve.

FIG. 1c shows workpiece carrier 50 in a state in which front outer corner section 51a has engaged in a guiding manner with second straight outer guide section 42. In particular, the position is shown in which the guiding engagement with inner guide 30 transitions from curved inner guide section 35 to end 34 of second straight inner guide section 32. End 34 slides along a guide surface section 58, which is formed by a second wave trough, of inner wave-shaped lateral surface 55. Reference is also made to the play shown in FIG. 1c, in the region of rear outer corner section 51c.

Figure 1D:
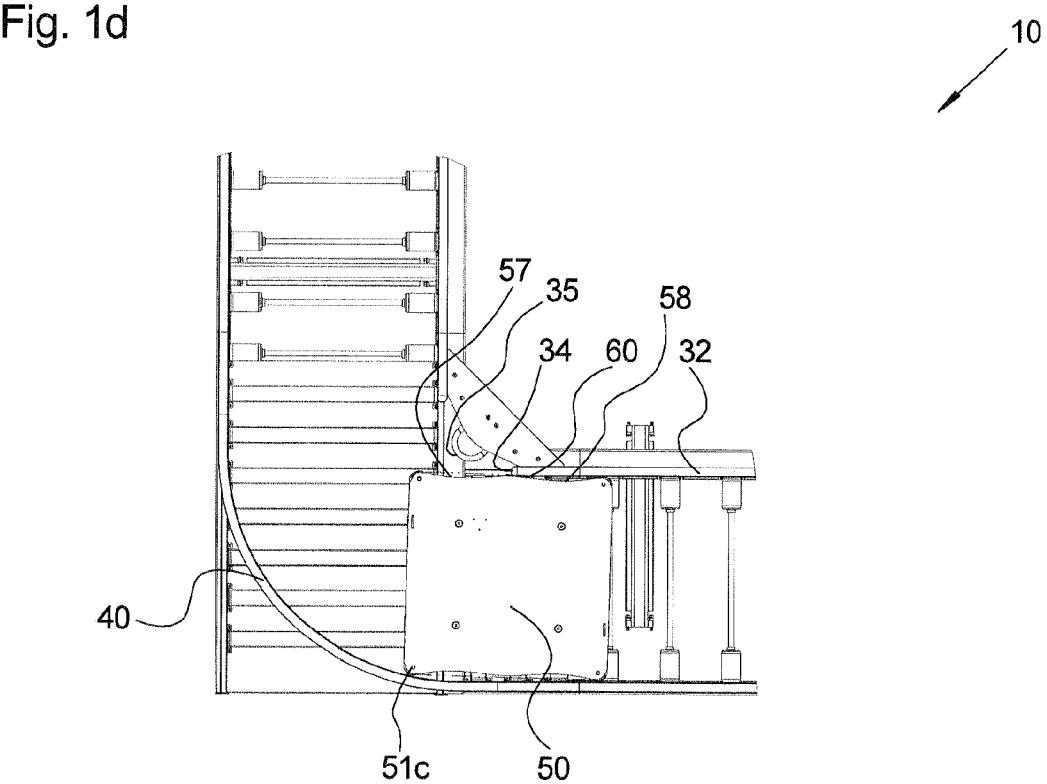
FIG. 1d shows a variation of FIG. 1, in which the workpiece carrier is located in a fifth stage of traveling around a curve.

FIG. 1d shows workpiece carrier 50 in a state in which rear outer corner section 51c has likewise become engaged with outer guide 40. This is brought about by the fact that end 34 of second straight inner guide section 32 runs along wave crest 60 of wave-shaped inner lateral surface, thereby lifting workpiece carrier 50 off of inner guide section 35 and displacing it in the direction of outer guide 40. It is pointed out that workpiece carrier 50 is symmetric about the longitudinal axis and the transverse axis, thereby making it usable for right and left-handed curves, and for moving forward and backward. As a result, existing evading recess 57 acts as guide surface section 58 when the direction of travel is reversed.

Figure 2:
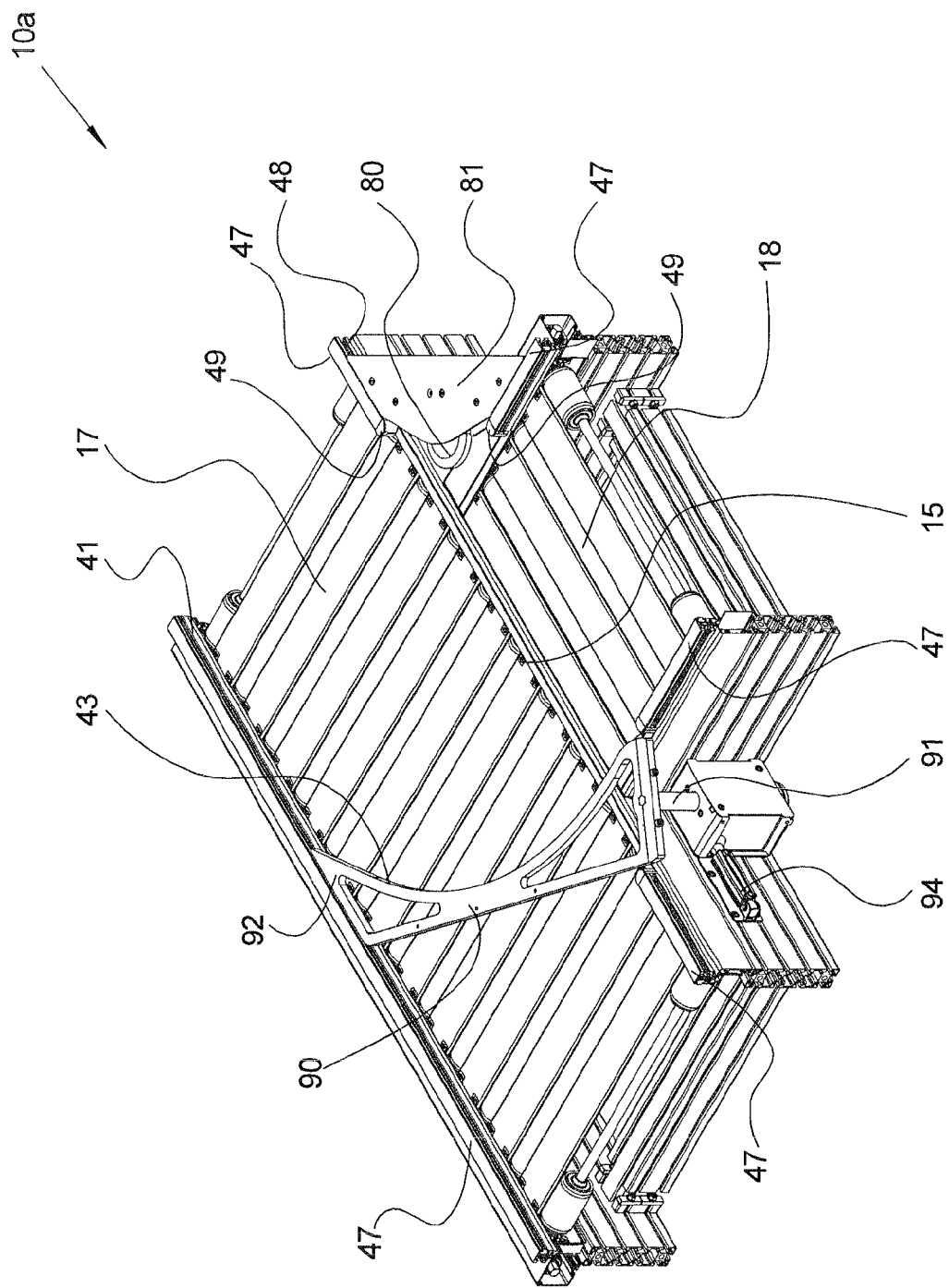
FIG. 2 shows a further conveyor, according to the present invention, which is designed as a rail; the rail arm is located in a first position.

FIG. 2 shows a further embodiment of a conveyor 10a according to the present invention, in which curved outer guide section 43 is designed as pivotable rail arm 90. Rail arm 90 may be rotated about pivot axis 91 into the position shown in FIG. 2a, thereby enabling first roller track 17 to be traveled along by the workpiece carrier (not depicted) without being deflected to second roller track 18. The conveyor shown in FIG. 2 is therefore a rail. The movements of rail arm 90 are brought about by a pneumatic cylinder 94 which acts on pivot axis 91 via a lever arm; its opposite end is fastened to first roller track 17. Rail arm 90 is designed such that it may fit in the installation space occupied by retaining assembly 81 comprising inner guide part 80 on the opposite side of conveyor track 15.

In the position shown in FIG. 2, end 92 of rail arm 90 facing away from pivot axis 91 bears against first straight outer guide section 41 so that the deflection forces caused by the workpiece carrier do not create any torque that stresses drive 94 of rail arm 90. Curved outer guide section 43 transitions into first straight outer guide section 41 via an obvious bend, and so the material strength of rail arm 90 in this region is great enough to withstand the loads induced by the workpiece carrier. Due to this design of rail arm 90, the play of workpiece carrier in the curve is slightly higher than it is in the conditions shown in FIGS. 1 through 1d, although this has proven to be harmless.

In addition, aluminum profile sections 47, which were used to form outer and inner guides, are shown in FIG. 2. Aluminum profile sections 47 include undercut grooves 48 to which retaining assembly 81 is fastened. The ends of the first and the second straight inner guide sections are formed by a separate end piece 49 composed of plastic, they have a semi-cylindrical shape, and they are tightly screwed to the end faces of assigned aluminum profile sections 47. It is pointed out that the embodiment shown in FIG. 2 does not differ from the embodiment shown in FIG. 1 except for the rail arm 90, and so the descriptions provided above apply here as well, and the same reference numerals are used to label the same parts.

Figure 2A:
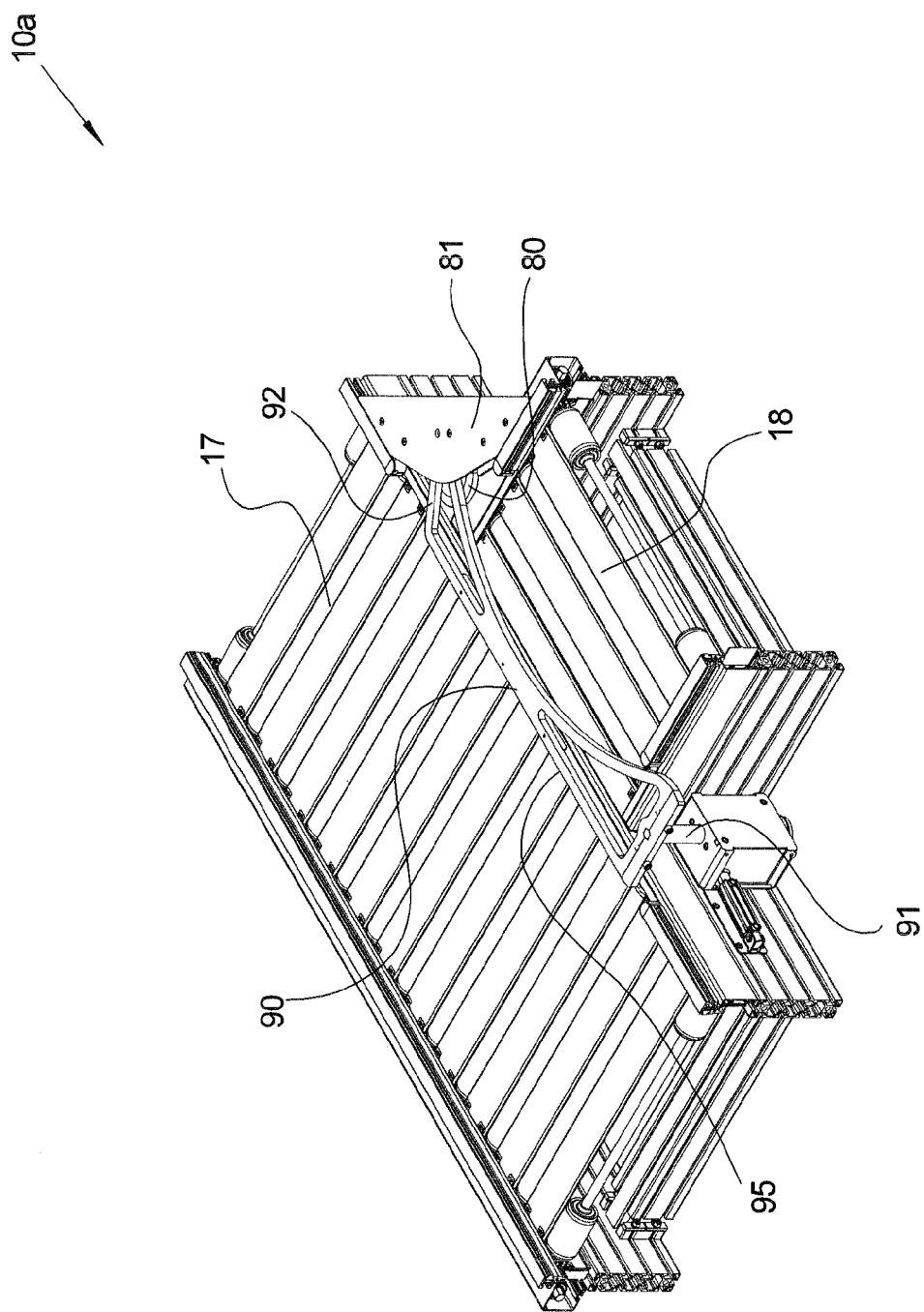
FIG. 2a shows a variation of FIG. 2, in which the rail arm is located in a second position.

FIG. 2a shows the rail in a second position, in which the workpiece carrier (not shown) is not redirected from first roller track 17 to second roller track 18. For this purpose, rail arm 90 was rotated into a position in which its end 92 facing away from pivot axis 91 engages in retaining assembly 81; substantially plate-type rail arm 90 is located above inner guide part 80. As a result, curved outer guide section 43 on rail arm 91, and the curved inner guide section on inner guide part 80 are located at different heights relative to the plane of conveyance. Accordingly, the substantially plate-type workpiece carrier must be thick enough to be gripped by both curved guide sections. Due to the aforementioned engagement in retaining assembly 81, rail arm 91 is unable to bend up or down, which could cause straight guide surface 95 of rail arm 90 to become disengaged from workpiece carrier.

Figure 3:
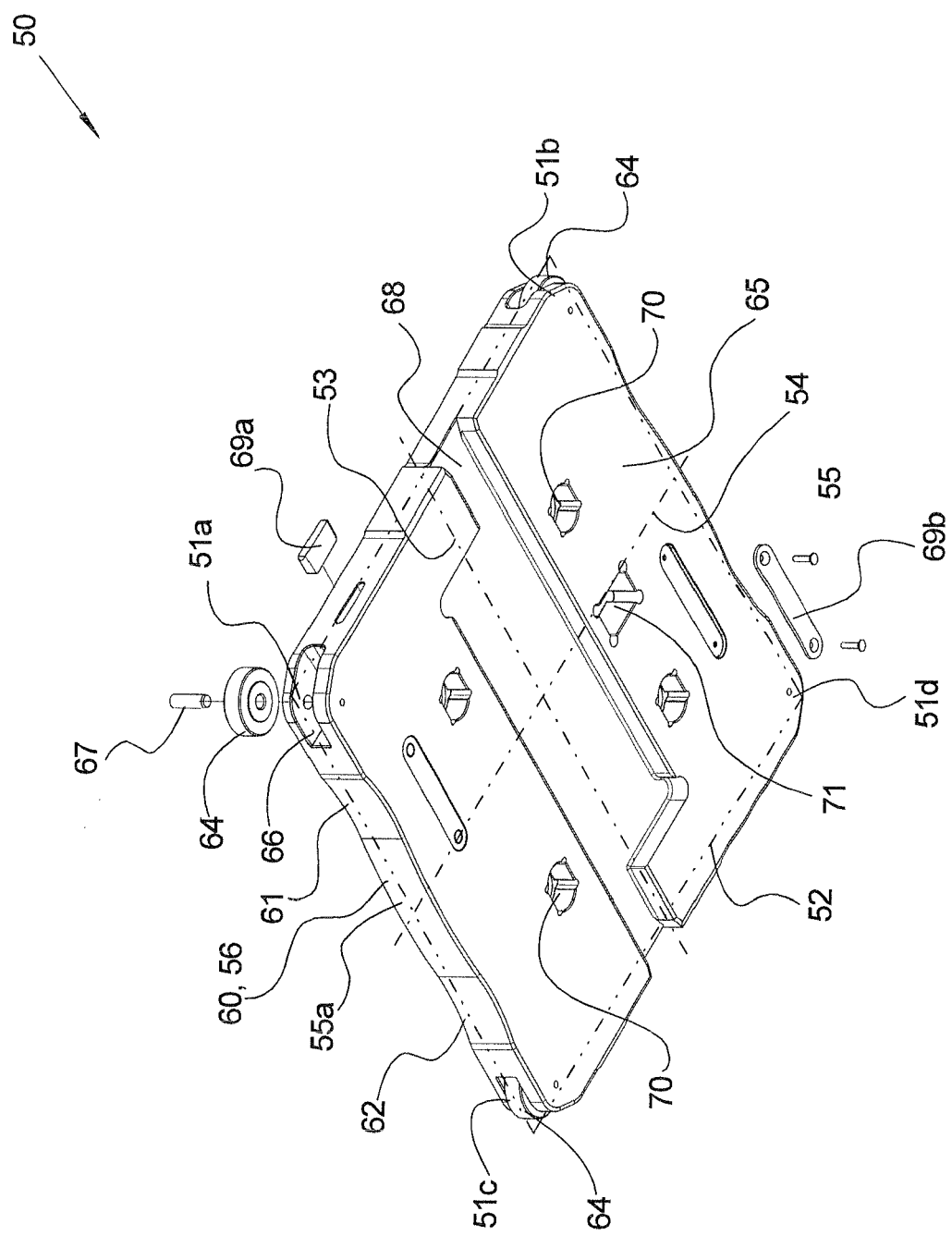
FIG. 3 shows an exploded view of the workpiece carrier.

FIG. 3 shows an exploded view of workpiece carrier 50. Workpiece carrier 50 includes a substantially square, plate-type body 65 composed of plastic. A guide roller 64 which is rotatably supported on a cylindrical pin 67 is provided at each of the four corner sections 51a; 51b; 51c; 51d. Every guide roller 64 is accommodated in a modified recess 66 such that it extends slightly beyond body 65. Four guide rollers 64 therefore define an imaged square, and body 65 does not extend past square 52. It is therefore always ensured that only guide rollers 64 bear against aluminum profile sections (FIG. 2; 47) which form the inner and outer guides, thereby ensuring that only rolling friction occurs between the workpiece carrier and the lateral guide. If workpiece carrier 50 is provided with superstructures that are provided for holding the workpieces, it must be ensured that they do not extend to the height of the inner and outer guides, which is substantially defined by the height of the aluminum profile sections (FIG. 2; 47). It is also pointed out that the border of workpiece carrier 50 is symmetrical relative to longitudinal axis 53 and transverse axis 54 of imagined square 52.

Two opposite lateral surfaces 55; 55a of the workpiece carrier are wave-shaped in design between guide rollers 64, and include a first wave trough 61, a second wave trough 62, and a wave crest 60; the aforementioned regions transition into one another without bends or projections. As explained with reference to FIGS. 1 through 1d, these contours form the evading recess, deflection surface section 56, and the guide surface section; the assignment of functionality and geometry depends on the direction of travel of workpiece carrier 50.

A separation passage 68, which is designed as a recess in a known manner, is provided on the underside of workpiece carrier 50. Furthermore, workpiece carrier 50 is provided with various metal inserts 69a; 69b that are provided to induce a response from inductive proximity switches located on the edge or underneath the conveyance track. Using the aforementioned proximity switches, it is possible to determine whether a workpiece carrier is present or absent relative to a certain position on the conveyor track.

Furthermore, a recess 71 for accommodating an RFID tag, i.e., a data memory that may be accessed wirelessly, is provided in the underside of workpiece carrier 50. Data memories of this type are typically used in conveyor systems to determine which of the several workpiece carriers in circulation is located in front of assigned RFID reader which is usually assigned to a processing station for the conveyed workpieces.

Finally, reference is made to four blind holes 70 which are provided to accommodate counternuts composed of metal, thereby enabling superstructures to be screwed onto the top side of workpiece carrier 50.

Figure 4:
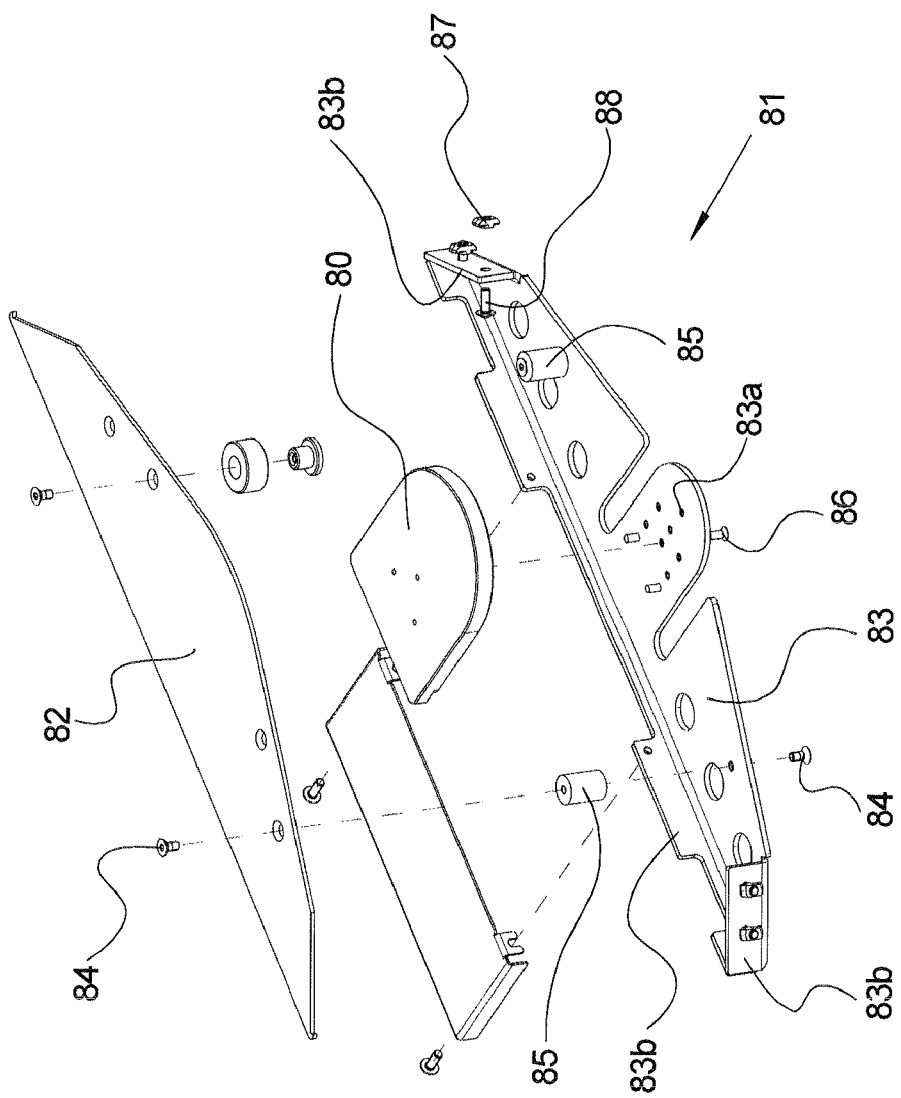
FIG. 4 shows an exploded view of the retaining assembly with the inner guide part.

FIG. 4 shows retaining assembly 81 with inner guide part 80. Retaining assembly 81 includes a bottom plate 83 composed of steel sheet which includes a plurality of tabs 83b bent by 90°. A top plate 82 is fastened to bottom plate 83 using spacer sleeves 85 and first screw bolts 84. Top plate 82 is likewise composed of steel sheet and, together with bottom plate 83, forms a substantially box-type structure comprising a retaining recess. Inner guide part 80, which is fastened to bottom plate 83 via two screw bolts 86, is accommodated inside retaining recess. For this purpose, a large number of fastening bores 83a is provided in bottom plate 83, thereby enabling inner guide part 80 to be attached in different positions. The entire assembly may therefore be used in conveyors having different structural dimensions. Furthermore, third screw bolts 88 are provided which engage via hammer nuts 87 in the undercut grooves (FIG. 2; 48) of aluminium profile sections (FIG. 2; 47), to fasten the entire assembly to the conveyor. It is pointed out that top plate 82 is situated at a distance from inner guide part 80, thereby enabling the rail arm (FIG. 2; 90) to engage in the corresponding open space, as described above with reference to FIG. 2a.

It will be understood that each of the elements described above, or two or more together, may also find a useful application in other types of constructions differing from the types described above.

While the invention has been illustrated and described as embodied in a conveyor comprising a curve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A conveyor, comprising:
   at least one workpiece carrier;
   drive means for driving the workpiece carrier and defining a plane of conveyance; and
   an inner guide and an outer guide that define a conveyor track for the workpiece carrier, wherein the outer guide includes a first straight outer guide section, an outer guide section that is concavely curved as viewed from the conveyor track, and a second straight outer guide section, which are situated one behind the other thereby enabling the sections to guide the workpiece carrier without interruption, wherein the inner guide includes a first straight inner guide section and a second straight inner guide section, each situated parallel to and at a distance of a specified track width from the first and second straight outer guide sections, wherein the inner guide furthermore includes an inner guide section which is convexly curved as viewed from the conveyor track and is assigned to the curved outer guide section, with a radius of curvature of the curved inner guide section being less than 50% of the track width, and wherein the convexly curved inner guide section is situated such that it is offset radially inwardly relative to the curved outer guide section and radially inwardly offset relative to the first and second straight inner guide sections opposite an imagined tangential extension of the first and the second straight inner guide sections.

2. The conveyor as defined in claim 1, wherein the first and/or second straight inner guide section(s) include an end, and the inner guide is configured in a region between the end and the convexly curved inner guide section, such that contact between the inner guide and the workpiece carrier is ruled out.

3. The conveyor as defined in claim 1, further comprising an evading recess in a first lateral surface of the workpiece carrier facing the inner guide, and configured such that a movement of the workpiece carrier is not blockable by an end of the first straight inner guide section.

4. The conveyor as defined in claim 3, wherein an end of the second straight inner guide section is situated such that a guide surface section of the first lateral surface of the workpiece carrier is engageable in a guiding manner with the end of the second straight inner guide section.

5. The conveyor as defined in claim 3, wherein the first lateral surface of the workpiece carrier has an uninterrupted, smooth shape.

6. A conveyor, comprising:
at least one workpiece carrier;
drive means for driving the workpiece carrier and defining a plane of conveyance;
an inner guide and an outer guide that define a conveyor track for the workpiece carrier, wherein the outer guide includes a first straight outer guide section, an outer guide section that is concavely curved as viewed from the conveyor track, and a second straight outer guide section, which are situated one behind the other thereby enabling the sections to guide the workpiece carrier without interruption, wherein the inner guide includes a first straight inner guide section and a second straight inner guide section, each situated parallel to and at a distance of a specified track width from the first and second straight outer guide sections, wherein the inner guide furthermore includes an inner guide section which is convexly curved as viewed from the conveyor track and is assigned to the curved outer guide section, with a radius of curvature of the curved inner guide section being less than 50% of the track width, and wherein the convexly curved inner guide section is situated such that it is offset radially inwardly relative to the curved outer guide section and opposite an imagined tangential extension of the first and the second straight inner guide sections;
an evading recess in a first lateral surface of the workpiece carrier facing the inner guide, and configured such that a movement of the workpiece carrier is not blockable by an end of the first straight inner guide section,
wherein the first lateral surface of the workpiece carrier has an uninterrupted, smooth shape, and wherein the inner lateral surface of the workpiece carrier has a wave-shaped design, including a wave crest, a first wave trough which is used as the evading recess, and a second wave trough which corresponds to the guide surface section, wherein the wave crest is situated such that it is engageable in a guiding manner with the curved inner guide section.

7. The conveyor as defined in claim 1, wherein a distance between ends of the first and second straight inner guide sections to the curved inner guide section is substantially equal.

8. The conveyor as defined in claim 4, further comprising a rotatable guide roller provided on an end of the first and/or second straight inner guide section(s) and engageable in a guiding manner with the workpiece carrier such that it rolls on the guide surface section.

9. A conveyor, comprising:
at least one workpiece carrier;
drive means for driving the workpiece carrier and defining a plane of conveyance;
an inner guide and an outer guide that define a conveyor track for the workpiece carrier, wherein the outer guide includes a first straight outer guide section, an outer guide section that is concavely curved as viewed from the conveyor track, and a second straight outer guide section, which are situated one behind the other thereby enabling the sections to guide the workpiece carrier without interruption, wherein the inner guide includes a first straight inner guide section and a second straight inner guide section, each situated parallel to and at a distance of a specified track width from the first and second straight outer guide sections, wherein the inner guide furthermore includes an inner guide section which is convexly curved as viewed from the conveyor track and is assigned to the curved outer guide section, with a radius of curvature of the curved inner guide section being less than 50% of the track width, and wherein the convexly curved inner guide section is situated such that it is offset radially inwardly relative to the curved outer guide section and opposite an imagined tangential extension of the first and the second straight inner guide sections,
wherein the workpiece carrier includes four corner sections that define corners of an imagined rectangle and does not extend beyond the imagined rectangle at a height of the inner and outer guides.

10. The conveyor as defined in claim 9, wherein the four corner sections are rotatable guide rollers.

11. The conveyor as defined in claim 10, wherein the workpiece carrier includes a body having a recess, and wherein the guide rollers are accommodated in a recess in the body.

12. The conveyor as defined in claim 1, wherein the curved outer guide section and the curved inner guide section are circularly curved about a same center of a circle.

13. The conveyor as defined in claim 1, and further comprising a separate, plate-type inner guide part on which the curved inner guide section is formed, and a retaining assembly to which the inner guide part is attachable in different radial positions relative to the curved outer guide section.

14. The conveyor as defined in claim 13, further comprising a pivotable rail arm having a pivot axis which is perpendicular to the plane of conveyance and located outside the conveyor track, wherein the rail arm forms the curved outer guide section and is rotatable into a position in which its end facing away from the pivot axis engages in a retaining recess of the retainer assembly, in which the inner guide part is located.

15. A conveyor, comprising:
at least one workpiece carrier;
drive means for driving the workpiece carrier and defining a plane of conveyance;

an inner guide and an outer guide that define a conveyor track for the workpiece carrier, wherein the outer guide includes a first straight outer guide section, an outer guide section that is concavely curved as viewed from the conveyor track, and a second straight outer guide section, which are situated one behind the other thereby enabling the sections to guide the workpiece carrier without interruption, wherein the inner guide includes a first straight inner guide section and a second straight inner guide section, each situated parallel to and at a distance of a specified track width from the first and second straight outer guide sections, wherein the inner guide furthermore includes an inner guide section which is convexly curved as viewed from the conveyor track and is assigned to the curved outer guide section, with a radius of curvature of the curved inner guide section being less than 50% of the track width, and wherein the convexly curved inner guide section is situated such that it is offset radially inwardly relative to the curved outer guide section and opposite an imagined tangential extension of the first and the second straight inner guide sections, wherein the workpiece carrier includes four corner sections having rotatable guide rollers that define corners of an imagined triangle and does not extend beyond the imagined triangle at the height of the guide rollers, and a wave-shaped lateral surface having a wave crest and two adjacent wave troughs provided between at least two of the guide rollers.

* * * * *